United States Patent Office 2,791,562
Patented May 7, 1957

2,791,562
METHOD OF PRODUCING DRY DETERGENT COMPOSITIONS

Walter J. Diffley, Wilmington, Calif.

No Drawing. Application September 26, 1951,
Serial No. 248,457

7 Claims. (Cl. 252—138)

This invention relates to a method of producing dry detergent compositions. More particularly it relates to a chemical as distinguished from a thermal method of treating aqueous slurries, pastes and solutions of surface active agents to remove liquid water therefrom and produce either a wet product containing less liquid water or a dry product.

Certain surface active agents such as alkyl aryl sulphonates are available to the trade in the form of slurries or pastes, and for certain uses of these products it is necessary to dry them to produce a dry granular or flake product. Customarily these pastes and slurries are dried by thermal means, as by spray drying, drum drying or calcining.

Thermal methods of drying pastes and slurries of surface active agents are disadvantageous for several reasons. For example, the heating equipment required is expensive and cumbersome. Also considerable energy in the form of heat is required to accomplish the vaporization of water.

It is an object of the present invention to provide an improved method of drying pastes, slurries and solutions of surface active agents.

It is a particular object of the invention to provide a method of removing liquid water from slurries, pastes and solutions of surface active agents without the use of heat.

It is a further object of the invention to provide a method of removing liquid water from slurries, pastes and solutions of surface active agents by chemical means.

Yet another object of the invention is to provide a chemical method of removing liquid water from slurries, pastes and solutions of surface active agents by chemical means and, simultaneously with the removal of water, incorporating in the surface active agent a valuable adjunct such as a builder.

Yet another object of the invention is to provide a chemical method of removing free or liquid water from pastes and slurries, which will accomplish the desired drying effect in a very short period of time.

These and other objects of the invention will be apparent from the ensuing description and appended claims.

In accordance with the method of my invention, an aqueous dispersion of a surface active agent is treated chemically to remove liquid water. By "aqueous dispersion" is meant an aqueous solution, an aqueous slurry, or an aqueous paste of the surface active agent. The chemical treatment comprises adding to and incorporating in such dispersion, two selected reactants capable of reacting with one another and with the liquid water of the dispersion to produce a reaction product containing water of crystallization in amount sufficient to produce a net loss of liquid water in the system. The method comprises adding such reactants in substantial quantities and in suitable proportions and conducting the aforesaid reaction in the dispersion.

The method of my invention may be employed to produce completely dry mixtures. Alternatively, it may be employed to effect only a partial removal of water, e. g., to convert a slurry to a paste.

The method of the invention is applicable to aqueous dispersions (i. e., solutions, slurries and pastes) of all types of surface active agents which are stable in alkaline solutions. Examples of slurries which are amenable to the method of my invention are aqueous slurries and pastes of alkyl aryl sulfonates such as the Nacconols (which is a trademark of the National Aniline Division, Allied Chemical and Dye Corp., New York); Santomerse No. 1 and Santomerse D (both trademarks of Monsanto Chemical Co., St. Louis, Missouri); Oronite Wetting Agent–S and Oronite alkyl aryl sulfonate slurry (which are trademarks of Oronite Chemical Co., San Francisco, California); NOPCO 1067 and 1086–C (trademarks of National Oil Products Co., Harrison, N. J.); and Ultrawet (trademark of Atlantic Refining Co., Philadelphia, Pa.); and Antaron L–520 (which is a trademark of General Aniline & Film Corp.). These and other surface active agents are amenable to the method of my invention. The Nacconols are described by Schwartz and Perry, "Surface Active Agents," Interscience Publishers, Inc., New York, 1949, page 122 as products of condensing a chlorinated petroleum fraction with benzene and sulfonating the condensation product. A particular example of a suitable Nacconol is that whose mode of preparation is described on page 122 of Schwartz and Perry, commencing with selection of a kerosene derived from a Pennsylvania crude and having an aniline point and 200 to 300°. The preparation of suitable Oronite Detergents is described in Letters Patent No. 2,477,383 to Allen H. Lewis, granted July 26, 1949. A particular example of a suitable slurry of Oronite Detergent is that described in column 25, at lines 6 to 31 of the Lewis patent. Suitable examples of Santomerse No. 1 and Santomerse D are described on pages 123 of Schwartz and Perry. NOPCO 1067 and 1086–C and Ultrawet are alkyl aryl sulphonates which are described in Schwartz and Perry, pages 123 and 310. Antaron L–520 is described in an article by John W. McCutcheon entitled "Synthetic detergents—up-to-date" appearing in the journal "Soap and Sanitary Chemicals," August 1949. It is there described as an alkyl amide sulfonate; as a detergent, wetter and dispersant; as being anionic; and as being non-foaming and possessing surface adsorption characteristics. It is also known that Antaron L–520 is the reaction product of palmityl chloride and cyclohexyltaurine in caustic and that the commercial product contains 2% NaCl and 1% free fatty acids. Further information about this product will be found in "Industrial and Engineering Chemistry," vol. 43, April 1951, pages 866–71.

These and other surface active agents, when available in the form of pastes, slurries or solutions containing, e. g., 10 to 90% water, may be treated in accordance with the present invention to convert all or a part of the free or liquid water to water of crystallization.

Examples of suitable reactants for effecting conversion of free or liquid water to water of crystallization are mixtures of borax and sodium hydroxide, mixtures of borax and sodium carbonate, mixtures of disodium phosphate and sodium hydroxide and mixtures of disodium phosphate and sodium carbonate. The pentahydrate form of borax, $Na_2B_4O_7.5H_2O$, is preferred because it is more soluble, hence reacts more rapidly, but other forms of borax containing 0 to 10 mols of water of crystallization may be employed. Still other mixtures of reactants may be employed provided they are compatible with the surface active agent, e. g., do not destroy it, and provided they interact with one another and with the liquid water of the dispersion to produce a reaction product which includes water of crystallization and which produces a net loss of liquid water from the system. The salt mixtures mentioned are, however, preferred because they produce end products which are useful as builders or other valuable adjuncts, as will be apparent from the following reactions which are involved in the process:

(1) $Na_2B_4O_7.5H_2O + 2NaOH + 10H_2O \rightarrow 4NaBO_2.4H_2O$
(2) $Na_2B_4O_7.5H_2O + 2Na_2CO_3 + 12H_2O \rightarrow$
$2NaHCO_3 + 4NaBO_2.4H_2O$
(3) $Na_2HPO_4 + NaOH + 11H_2O \rightarrow Na_3PO_4.12H_2O$
(4) $Na_2HPO_4 + Na_2CO_3 + 12H_2O \rightarrow$
$NaHCO_3 + Na_3NO_4.12H_2O$ It will be seen that each of these reactions is effective to remove a large quantity of water in relation to the amount of chemical agent added, and it will also be seen that the products of reaction include sodium metaborate (Reactions (1) and (2)), sodium bicarbonate (Reactions (2) and (4)) and trisodium phosphate (Reactions (3) and (4)). All of these reaction products, and particularly sodium metaborate and trisodium phosphate, are valuable alkaline builders for surface active agents. As is well known, builders of this character enhance surface activity. It will, therefore, be apparent that my chemical method not only extracts free water from pastes, slurries and solutions of surface active agents, but it also contributes valuable adjuncts, such as builders.

It will be noted that the reactions numbered (1) to (4) above are chemical reactions in which free water is one of the reactants and in which new compounds are formed containing water of crystallization. It is possible to remove liquid water from an aqueous dispersion by the addition of a single anhydrous salt, such as sodium carbonate, which is capable of taking up water in the form of water of crystallization. However, the employment of two reactants and of a chemical reaction therebetween, in accordance with the present invention, is much more advantageous because of the much greater speed of reaction.

Therefore, chemical reactions of the type represented by Reactions (1) to (4) are much more advantageous; they proceed rapidly so that drying of a slurry or paste is accomplished in a matter of minutes.

The slurries, pastes and solutions treated in accordance with my invention may contain widely varying proportions of active material and water. Illustrative examples are as follows:

*Example 1.*—(Slurry):

| | Percent |
|---|---|
| Surface active agent, e. g., an alkyl aryl sulfonate | 34–38 |
| Na₂SO₄ | 2–10 |
| H₂O | 64–52 |

*Example 2.*—(Paste):

| | Percent |
|---|---|
| Surface active agent, e. g., an alkyl aryl sulfonate | 51 |
| Na₂SO₄ | 8 |
| H₂O | 41 |

The following specific examples will serve further to illustrate my invention:

*Example 3.*—100 parts by weight of Oronite slurry consisting of:

| | Percent |
|---|---|
| Alkyl aryl sulfonate | 36 |
| Na₂SO₄ | 2 |
| H₂O | 62 | were treated with 150 parts by weight of borax (pentahydrate) and 40 parts by weight of sodium hydroxide. The borax and sodium hydroxide were added to a ribbon blender and the sulfonate slurry was heated to 140° F. and sprayed slowly into the dry mixture of borax and sodium hydroxide during operation of the blender to promote mixing of the ingredients. Considerable heat was evolved during the reaction but air cooling was sufficient to dissipate the heat of reaction. The ribbon blender may, however, be fitted with a water jacket, or with other suitable cooling means, to control the temperature during the process. It is desirable to maintain the temperature below 53° C. because at higher temperatures the sodium metaborate formed in accordance with Reaction (1) above, melts in its own water crystallization. This is disadvantageous because some of the water crystallization is released and tends to form lumps.

By the method of this example, a dry, granular product was produced in a very short period of time (a few minutes). The product had excellent detergent properties.

*Example 4.*—In another instance a similar sulfonate slurry was treated by the same method, i. e., by spraying it into a suitable mixture in a ribbon blender. In this instance the reagent mixture added consisted of 291 parts by weight of borax and 212 parts by weight of sodium carbonate. These proportions were used to treat 100 parts by weight of sulfonate slurry in the manner described in Example 3.

*Example 5.*—A mixture of borax, sodium carbonate and sodium hydroxide was employed as the reagent mixture. This mixture consisted of 291 parts by weight of borax, 106 parts by weight of sodium carbonate and 20 parts by weight of sodium hydroxide. It was used to treat 100 parts by weight of alkyl aryl sulfonate slurry in the manner described in Example 3.

*Example 6.*—100 parts by weight of Oronite slurry (same as used in Example 3) were treated with 142 parts by weight of Na₂HPO₄ and 40 parts by weight of NaOH. The method of treatment was the same as in Example 3. A dry product having excellent detergent properties was obtained.

*Example 7.*—100 parts by weight of Oronite slurry (same as used in Example 3) were treated with 142 parts by weight of Na₂HPO₄ and 100 parts by weight of Na₂CO₃. The method of treatment was the same as Example 3. A dry product having excellent detergent properties was obtained.

*Example 8.*—75 parts by weight of 62% aqueous slurry of Antaron L–520 were treated with 142 parts by weight of Na₂HPO₄ and 106 parts by weight of Na₂CO₃. In another instance, the same quantity of the same L–520 slurry was treated with 150 parts by weight of borax pentahydrate and 40 parts by weight of NaOH. In both instances the procedure of Example 3 was employed and a dry product having excellent detergent properties was produced.

The products of these examples and others within the scope of my invention are dry, granular or powdery detergents having a high alkalinity (about pH 11, more or less depending upon the end products and concentration) and high solubility in water. They are excellently buffered so as to yield all of their alkaline strength only on reaction. They can be used without further modification as detergents for laundry, bottle cleaning, metal cleaning and other purposes, and they can be used as detergent bases to which are added other builders and/or other surface active agents.

The preferred reagents, such as the borax-NaOH, borax-Na₂CO₃ and disodium phosphate-NaOH mixtures described above, may be employed in varying proportions and amounts to effect pH control. Thus, the reagents may be employed in a quantity and/or in proportion to yield a dry end product which can then be dissolved in water and adjusted to a pH of 9.8 for medium duty cleaning. Alternatively, the reagents may be employed in a quantity and/or proportion to yield a dry end product which can then be dissolved in water and adjusted to a pH of 11 for heavy duty cleaning purposes.

Another variable in the utilization of these reagents is with respect to the degree of conversion of free water to water of crystallization. As mentioned above, the method of the invention may be used to effect only partial conversion of free water, e. g., to convert a slurry to a paste. In this connection, the amount of water conversion can be very easily and accurately controlled by controlling the amount of added reagent. Thus a slurry can be converted to a paste of a predetermined consistency and water content by controlled addition of one of my reagents, and the paste can then be converted to a dry product by drum drying, or by centrifuging and air drying.

In the above examples, the components of the reagent mixtures were used in stoichiometric proportions. In general it is preferred to use the components in such proportions, but an excess of either may be used.

It will therefore be apparent that a method has been provided of rapidly removing free or liquid water from pastes, slurries and solutions of surface active agents. This method is effective to partially remove the free water, e. g., to convert a slurry to a paste, and it is also effective to completely remove free water to produce a dry powder. The method is chemical in nature and therefore avoids the disadvantages of thermal methods. Also, the method has certain additional advantages of importance. It incorporates in the final product a useful adjunct, such as a builder. The end product is excellently buffered and is readily soluble. The method is flexible and is adaptable to producing end products whose alkalinity and water content can be varied. And the method is well suited for use in conjunction with other drying methods.

I claim:

1. A method of treating an aqueous dispersion of an organic surface active material which is stable in alkaline solution to reduce the free water content thereof, which comprises adding to the dispersion borax containing not more than 10 mols of water crystallization and sodium hydroxide, said borax and sodium hydroxide being added in approximately stoichimetric proportions for the reaction $$Na_2B_4O_7.5H_2O + 2NaOH + 10H_2O \rightarrow 4NaBO_2.4H_2O$$

said borax and sodium hydroxide being added in quantity sufficient to reduce substantially the free water content of the dispersion by conversion to water of crystallization.

2. A method of reducing the free water content of an aqueous dispersion of an organic surface active material which is stable in alkaline solution, comprising adding to said dispersion a mixture of disodium phosphate and sodium hydroxide in approximately stoichiometric proportions for the reaction $$Na_2HPO_4 + NaOH + 11H_2O \rightarrow Na_3PO_4.12H_2O$$

said disodium phosphate and sodium hydroxide being added in quantity to substantially reduce free water content of the dispersion.

3. A method of treating an aqueous dispersion of an organic surface active material which is stable in alkaline solution to reduce the free water content thereof, which comprises adding to the dispersion a reagent mixture comprising sodium hydroxide and a reactant selected from the group consisting of borax containing not more than ten moles of water of crystallization and disodium phosphate, said sodium hydroxide and said reactant being added in quantities and proportions sufficient to react together to yield a solid reaction product containing water of crystallization and to thereby reduce substantially the free water content of the dispersion.

4. The method of claim 3 wherein the dispersion is a slurry and the reagent mixture is employed in quantity sufficient to yield a substantially dry, granular product.

5. The method of claim 4 wherein said slurry is a slurry of an alkylaryl sulfonate.

6. A method of producing a dry, granular surface active agent which comprises providing a quantity of anionic surface active acid of the type RAH wherein R is an oil-solubilizing group and AH is an ionizable, hydrophilic, acidic group, said acid being neutralizable by aqueous sodium hydroxide to yield the corresponding sodium salt, RANa, such salt being stable in alkaline solution, said method comprising: neutralizing said acid with an aqueous solution of sodium hydroxide to yield an aqueous slurry of the corresponding sodium salt, R.ANa; then treating said slurry with a reagent mixture of sodium hydroxide and a salt selected from the group consisting of borax containing not more than ten mols of water of crystallization and disodium phosphate, said mixture being employed in a quantity and in proportions sufficient to react together to form a solid reaction product containing water of crystallization and to thereby eliminate free water from the slurry by formation of such reaction product and to produce a dry granular mixture.

7. The method of claim 6 wherein AH is a sulfonic acid group.

References Cited in the file of this patent
UNITED STATES PATENTS

| 1,379,735 | Walker | May 31, 1921 |
| 1,492,921 | Knight | May 6, 1924 |
| 2,480,730 | Hafford | Aug. 30, 1949 |

FOREIGN PATENTS

| 490,285 | Great Britain | Aug. 11, 1938 |

OTHER REFERENCES

Mellor: Comprehensive Treatise on Inorganic and Theoretical Chemistry, 1922, vol. 2, page 847; vol. 5, page 67.

Jacobson: Encyclopedia of Chemical Reactions, vol. 1, page 697, 1946.